United States Patent Office 3,591,650
Patented July 6, 1971

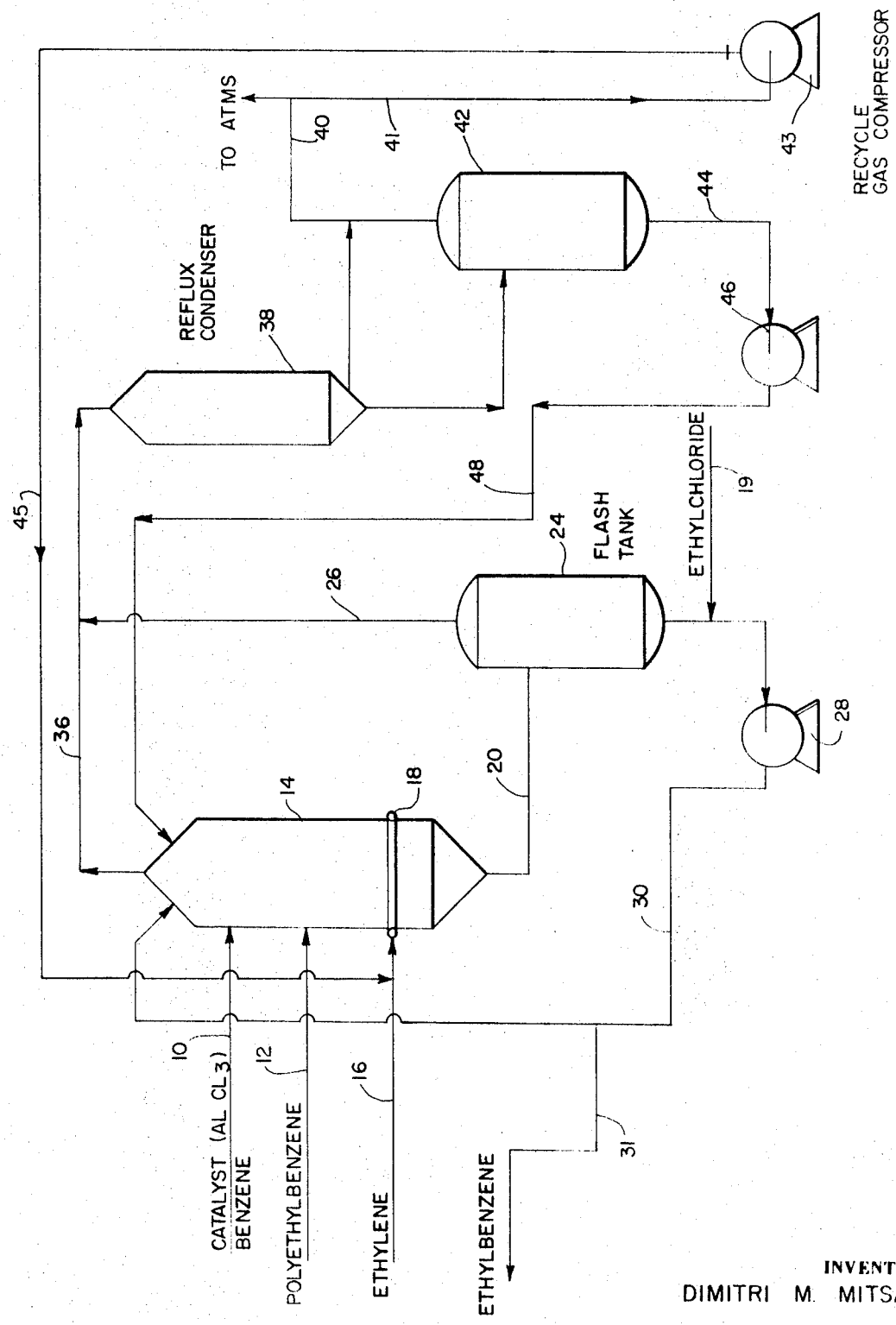

3,591,650
ALKYLATION PROCESS
Dimitri M. Mitsak, Edgeworth, Sewickley, Pa., assignor to Koppers Company, Inc., Pittsburgh, Pa.
Filed June 12, 1969, Ser. No. 832,653
Int. Cl. C07c 3/56
U.S. Cl. 260—671
8 Claims

ABSTRACT OF THE DISCLOSURE

An improved process for the alkylation of aromatic hydrocarbons in which product effluent from an alkylation reaction is flash distilled to recover unreacted aromatic and the recovered aromatic is combined with hydrogen chloride gas produced in the alkylation reaction. The combined vapors are cooled to condense the aromatic and dissolve the hydrogen chloride gas in the condensed aromatic, and the enriched condensate is thereafter returned to the alkylation reaction.

---

This invention relates to an improved process for the alkylation of aromatic hydrocarbons. More particularly, the invention relates to an improved recycling system for an alkylation process to reduce catalyst consumption and increase process efficiency.

Alkyl aromatics, and particularly lower mono-alkylated, mono-cyclic aromatic hydrocarbons, such as ethylbenzene, isopropylbenzene, and the like, are useful as solvents, as additives for aviation fuels, and as intermediates in the production of styrene and substituted styrene monomers. With the large quantities of polystyrene presently being produced, new methods are constantly being sought to improve its overall production process. The present invention therefore is particularly directed to an improved process for producing these alkylated intermediates for use in a styrene monomer production process.

Alkyl aromatics are synthesized by the alkylation of an aromatic hydrocarbon with an olefinic gas in the presence of a conventional alkylation catalyst, such as aluminum chloride. It has been known that alkylation takes place more rapidly in the presence of a halide promoter for the catalyst, such as liquid or gaseous ethyl chloride. Conventionally, the ethylchloride and olefinic gas are mixed and bubbled through a liquid column containing the aromatic and catalyst. Preferably, a polyalkylbenzene, such as polyethylbenzene, is also present in the alkylator as an absorption medium for the olefin gas to provide more intimate contact between the olefin reactant and the aromatic hydrocarbon.

Hydrogen chloride gas produced in the alkylation reaction together with any unreacted and unabsorbed olefin and any vaporized aromatic pass off from the top of the alkylator as gaseous effluent and the reaction mixture containing alkylated product, spent catalyst and unreacted aromatic are drawn off near the top of the alkylator as product effluent. Generally, the gaseous effluent is cooled, the condensables being returned to the alkylator, while the non-condensables, hydrogen chloride and olefin, are vented to the atmosphere, or if effluent treatment is required, are scrubbed with caustic solution. The product effluent is separated, the catalyst and unreacted aromatic being returned to the alkylator, while the alkylated product is recovered and purified to the final product.

In accordance with the present invention, it has been found that the alkylation process can be improved by flash distilling the product effluent to vaporize substantial quantities of the unreacted aromatic and then combining the vaporized aromatic with the gaseous effluent from the alkylator. The combined vapors are cooled to condense the aromatic and dissolve the hydrogen chloride gas in the condensed aromatic, and the enriched condensate is thereafter returned to the alkylator. Combining unreacted aromatic with the gaseous hydrogen chloride effluent from the alkylator and recycling the hydrogen chloride dissolved in the aromatic to the alkylator enhances the activity of the metal halide catalyst, thereby reducing fresh catalyst consumption and increasing the efficiency of the alkylation process.

Preferably, the combined vapors are cooled in a reflux condenser so that the descending aromatic condensate more intimately contacts the ascending vapors to scrub the vapors of hydrogen chloride gas and absorb it in the aromatic being recycled to the alkylator.

It is to be understood that both the foregoing general description and the following detailed description are exemplary and explanatory but are not restrictive of the invention.

The accompanying drawing which is incorporated in and constitutes a part of this specification, illustrates a preferred embodiment of the invention, and together with the description serves to explain the principles of the invention.

The drawing is a schematic diagram of an overall alkylation process embodying the improvement of this invention.

For purposes of illustration, the alkylating process of this invention will be described with relation to the production of ethylbenzene from ethylene and benzene. It is to be understood, however, that other mono- and poly-alkylated, mono-cyclic aromatics may also be produced without departing from the scope of this invention.

As shown in the drawing, a mixture of benzene and fresh catalyst is fed through line 10, and polyethylbenzene through line 12, to an alkylator 14.

A gaseous olefin is fed to alkylator 14 through line 16 from a suitable source (not shown). In the illustrated embodiment, ethylene or an ethylene-containing stream is used as the source of olefin, but any olefin may be used depending upon the desired alkylated product. Propylene, for example, can be used to produce isopropylbenzene (cumene).

The olefinic gas in line 16 is passed to a distribution ring 18 where it is injected into the bottom of alkylator 14 through jet injectors or similar devices, causing the olefinic gas to bubble upwardly through the aromatic solution in the alkylator.

The catalyst used in the alkylation process is a conventional metal halide alkylation catalyst, and preferably is aluminum chloride or one of its complexes. The polyethylbenzene is added to the catalyst-benzene solution in an amount of from about 1,300 pounds per hour to 2,600 pounds per hour, based on the weight of the solution, as an additional absorption medium for the olefinic gas bubbling through the solution to provide more intimate contacting of the olefin reactant gas with the benzene.

With an aluminum chloride catalyst, alkylator 14 is operated at a temperature of from about 80° C. to 150° C., preferably at about 105° C. to 115° C., and at a pressure of atmospheric to 100 p.s.i.g., and preferably from about 30 p.s.i.g. to 60 p.s.i.g.

An activator or catalyst promoter is conventionally added to alkylator 40. In the illustrated embodiment, the promoter is added through line 19 where it is mixed with recycling catalyst. The promoter, however, may be added to any of the incoming streams or directly to the alkylator. Addition to the catalyst recycle stream is preferred to obtain a more thorough mixing of the catalyst and its promoter.

The promoter is suitably a hydrogen halide, such as HCl, HBr, or a substance yielding a hydrogen halide under reaction conditions, such as an alkyl halide. Ethyl chloride is a preferred promoter for use in the alkylating process of this invention. The promoter is used in an amount of from about 40 to 100%, based on the weight of the catalyst and preferably about 60%.

In accordance with the invention, product effluent containing alkylated product (ethylbenzene), unreacted benzene, and catalyst complex formed in the alkylation reaction is withdrawn from the bottom of alkylator 14 and passed through line 20 to a flash tank 24 operating at a reduced pressure, and generally around 5 p.s.i.g. As a result of the mixture entering flash tank 24, a substantial amount of unreacted benzene is distilled and passes out of tank 24 through line 26. The vapors from flash tank 24 may also contain small amounts of ethylene, generally about 2 to 5% of the fresh ethylene fed to the alkylator depending upon the temperature and pressure in the alkylator.

The residue following flashing is withdrawn from the bottom of flash tank 24, pumped at 28, and returned through recycle line 30 to alkylator 14. Recycling stream 30 consists essentially of crude alkylated product, undistilled benzene, complexed catalyst, and the ethyl chloride promoter which has been added to the stream at 19.

Crude alkylated product (ethylbenzene) is continuously withdrawn at 31 from recycling stream 30 after which it is washed, neutralized, and distilled, as is well known to those skilled in the art to obtain the final purified ethylbenzene product.

From the top of alkylator 14, a gaseous effluent passes off through line 36, which consists essentially of hydrogen chloride gas produced in the alkylation reactions, any unreacted and unabsorbed ethylene together with small amounts of ethyl chloride and vaporized benzene.

In accordance with this invention the benzene vapors in line 26 are combined with the gaseous effluent in line 36 and the combined vapors are cooled in a condensed 38 to a temperature sufficient to condense the benzene vapors.

Preferably, condenser 38 is a reflux condenser, so that the descending benzene condensate continuously and more intimately contacts the ascending vapors to scrubs the vapors of hydrogen chloride gas and dissolve it in the liquid benzene. Any uncondensed vapors, primarily ethylene and any undissolved hydrogen chloride, are vented to the atmosphere as non-condensables through line 40. Further improvement in catalyst and olefin utilization is possible by conducting the non-condensable through line 41 to a gas compressor 42 and recycling these to alkylator 14 through line 45.

The enriched benzene containing dissolved hydrogen chloride is passed from condenser 38 to a reservoir 42 and from reservoir 42 through line 44, pump 46, and line 48 back to alkylator 14.

By flash distilling the product effluent from an alkylation reaction to recover unreacted benzene; combining the recovered benzene vapors with hydrogen chloride gas from the alkylation reaction; condensing the combined vapors; and recycling the hydrogen chlroide enriched benzene condensate to the alkylator in accordance with the process of this invention, the activity of the metal chloride alkylation catalyst is maintained and the consumption of fresh catalyst is reduced, thereby increasing overall process efficiency in terms of product yields per pound of catalyst consumed.

For a clearer understanding of this invention, a specific example of it is set forth below. This example, however, is merely illustrative and is not intended to limit the scope and underlying princples of the invention in any way.

EXAMPLE

To a conventional alkylator having a liquid capacity approximately 4 feet in diameter and 30 feet in height and a conical top and bottom, is fed 2,510 lbs./hr. of polyethylbenzene, and a mixture of 13,650 lbs./hr. of benzene and 58 lbs./hr. of aluminum chloride. Substantially pure ethylene is fed to the bottom of the alkylator through dispersion nozzles at a rate of about 1,925 lbs./hr. A pressure of 40 p.s.i.g. and a temperature of 110° C. is maintained in the alkylator.

120,000 lbs./hr. of product effluent consisting essentially of crude ethylbenzene, unreacted benzene, and a complex catalyst phase are withdrawn from the bottom of the alkylator and fed to a flash tank which is under pressure of about 5 p.s.i.g. In the flash tank about 11,500 lbs./hr. of benzene and minor amounts of any dissolved ethylene present in the effluent flash off. Due to flash evaporation of the benzene, the residue following flash distillation is cooled to a temperature of about 93° C.

The residue consisting essentially of crude ethylenzene, undistilled benzene, and complexed catalyst is recycled to the alkylator and about 18,180 lbs./hr. are continuously withdrawn from the recirculating residue and purified to obtain the final ethylbenzene product. About 35.4 lbs./hr. of ethyl chloride are added to the recycling residue as a promoter for the aluminum chloride catalyst.

Gaseous effluent from the alkylator containing hydrogen chloride gas produced in the alkylation reaction together with minor amounts of any unreacted ethylene and vaporized benzene are combined with the benzene vapors from the flash tank and the combined vapors are cooled in reflux condenser operating at a temperature below 46° C., to condense the benzene and dissolve the hydrogen chloride gas in the condensed benzene. The enriched benzene condensate containing approximately 0.05 to 0.3% dissolved hydrogen chloride is collected in a reservoir and recycled to the alkylator at a rate of 11,500 lbs./hr.

Undissolved hydrogen chloride and non-condensable gases, such as ethylene, are vented to the atmosphere from the reservoir or they can be conducted to a gas compressor and recycled to the alkylator.

The invention in its broader aspects is not limited to the specific details shown and described and departures may be made from such details without departing from the principles of the invention and without sacrificing its chief advantages.

What is claimed is:

1. In a process for alkylating an aromatic hydrocarbon in which an olefinic gas is passed through a solution of an aromatic hydrocarbon in an alkylating zone in the presence of a metal chloride alkylation catalyst, and in which a gaseous effluent is produced containing hydrogen chloride gas formed in the alkylation reaction and unreacted olefin and a liquid product effluent is produced containing alkylated product, catalyst, and unreacted aromatic hydrocarbon, the improvement which comprises:
   (a) feeding the product effluent from the alkylating zone to a vaporizing zone to flash distill the aromatic hydrocarbon and produce a liquid residue containing alkylated product and catalyst;
   (b) combining the aromatic hydrocarbon vapors from the vaporizing zone with the gaseous effluent from the alkylating zone;
   (c) cooling the combined vapors to condense the aromatic hydrocarbon and dissolve a substantial portion of the hydrogen chloride gas in the condensed aromatic hydrocarbon;
   (d) recycling the hydrogen chloride enriched condensate to the alkylating zone;
   (e) recycling the liquid residue from the vaporizing zone to the alkylating zone; and
   (f) withdrawing and purifying a portion of the recycling liquid residue to recover the alkylated product.

2. The process of claim 1, in which the combined vapors are cooled in step (c) in a reflux condenser.

3. The process of claim 1, in which undissolved hydrogen chloride gas and unreacted olefin in step (c) is vented to the atmosphere before recycling the condensate to the alkylating zone.

4. The process of claim 1, in which undissolved hydrogen chloride and unreacted olefin in step (c) is compressed and recycled to alkylator.

5. The process of claim 1, in which the aromatic hydrocarbon is benzene, and the olefinic gas is ethylene.

6. The process of claim 1, in which an alkyl chloride promoter is added to the recycling liquid residue.

7. The process of claim 6, in which the promoter is ethyl chloride.

8. The process of claim 1, in which the catalyst is aluminum chloride.

References Cited

UNITED STATES PATENTS

| | | |
|---|---|---|
| 3,306,943 | 2/1967 | Sulo et al. |
| 3,441,483 | 4/1969 | Hart. |
| 3,478,119 | 11/1969 | Maier et al. |

CURTIS R. DAVIS, Primary Examiner